(12) United States Patent
Senga et al.

(10) Patent No.: US 6,669,765 B2
(45) Date of Patent: Dec. 30, 2003

(54) THERMOCHROMIC DRY OFFSET INK, AND PRINTED ARTICLE PRODUCED USING THE SAME

(75) Inventors: Kuniyuki Senga, Aichi-ken (JP); Masahiro Ito, Aichi-ken (JP)

(73) Assignee: The Pilot Ink Co., Ltd., Aichi-Ken (JP)

( * ) Notice: Subject to any disclaimer, the term of this patent is extended or adjusted under 35 U.S.C. 154(b) by 30 days.

(21) Appl. No.: 09/797,567

(22) Filed: Mar. 5, 2001

(65) Prior Publication Data

US 2002/0121218 A1 Sep. 5, 2002

(51) Int. Cl.[7] .......................... C09D 11/00; B41M 5/20; B41M 5/24
(52) U.S. Cl. ........................... 106/31.16; 503/214
(58) Field of Search ....................... 106/31.16; 503/214

(56) References Cited

U.S. PATENT DOCUMENTS 5,591,255 A * 1/1997 Small et al. ............. 106/31.61
5,997,849 A * 12/1999 Small et al. .................. 424/61
6,139,779 A * 10/2000 Small et al. ............. 106/31.13
6,271,300 B1 * 8/2001 Ohsumi et al. ............ 524/167

* cited by examiner

Primary Examiner—Mark L. Bell
Assistant Examiner—Veronica F. Faison
(74) Attorney, Agent, or Firm—Fitzpatrick, Cella, Harper & Scinto

(57) ABSTRACT

A thermochromic dry offset ink comprising a dry offset ink medium and a thermochromic pigment material dispersed therein, wherein the thermochromic pigment material is a pigment material which has a microcapsular form having non-round particle cross section and has a thermochromic material enclosed in the microcapsules. Also disclosed is a printed article produced using the ink. The thermochromic dry offset ink can more improve pressure resistance and heat resistance and also can more satisfy uniform printability and high-speed continuous printability in offset printing especially on articles such as containers.

17 Claims, 4 Drawing Sheets

THERMOCHROMIC DRY OFFSET INK, AND PRINTED ARTICLE PRODUCED USING THE SAME

The disclosures of Japanese Application No. 11-20323 is hereby incorporated by reference.

BACKGROUND OF THE INVENTION

1. Field of the Invention

This invention relates to a thermochromic dry offset ink, and a printed article produced using the ink. More particularly, it relates to a thermochromic dry offset ink which, in the steps of printing and heat curing, satisfies pressure resistance and heat-resisting strength and imparts ink transfer performance and uniform printing effect.

2. Related Background Art

The present applicant has proposed a thermochromic dry offset ink making use of a thermochromic pigment material or composition prepared by making into microcapsules a reversible thermochromic material containing three essential components consisting of an electron-donating color-developing organic compound, an electron-accepting compound capable of making the electron-donating color-developing organic compound develop a color and a reaction medium capable of controlling the temperature at which the color-developing reaction of the both compounds takes place (Japanese Patent Application Laid-Open No. 8-277373).

The above proposal intends to improve roll-to-roll ink transfer performance to achieve improvements in uniform printability and high-speed continuous printability in dry offset inks making use of thermochromic pigment materials.

SUMMARY OF THE INVENTION

The present inventor has made further researches on the above thermochromic dry offset ink. Accordingly, an object of the present invention is to provide a thermochromic dry offset ink which can more improve pressure resistance and heat resistance and also can more satisfy uniform printability and high-speed continuous printability, and a printed article provided with a thermochromic print layer formed using such an ink.

To achieve the above object, the present invention provides a thermochromic dry offset ink comprising a dry offset ink medium and a thermochromic pigment material dispersed therein, wherein the thermochromic pigment material is a pigment material which has a microcapsular form having non-round particle cross section and has a thermochromic material enclosed in the microcapsules.

As a preferred embodiment of the present invention, the thermochromic pigment material may have an average particle diameter [(length+breadth)/2] of from 1.0 µm to 5.0 µm;

the thermochromic pigment material may be a pigment material which has a microcapsular form of thermochromic material/wall film=7/1 to 1/1 (weight ratio);

the thermochromic pigment material may be a pigment material having a hollow at some part of a particle outer surface;

the thermochromic dry offset ink may contain at least one fine powder having the function of a spacer, selected from a fine thermosetting-resin powder, a fine thermoplastic-resin powder and a fine inorganic-material powder which have particle diameter larger than the average particle diameter of the thermochromic pigment material; the fine powder being mixed in an amount ranging from 5% by weight to 20% by weight; or the thermochromic pigment material may be held by from 10 parts by weight to 60 parts by weight per solid matter of the medium, based on 100 parts by weight of the medium.

The present invention also provides a printed article provided with a thermochromic print layer formed by offset printing, in which layer a thermochromic pigment material which has a microcapsular form having non-round particle cross section is fixed standing dispersed in the medium.

BRIEF DESCRIPTION OF THE DRAWINGS

FIG. 1A is an enlarged view of its appearance, and FIG. 1B, its cross section.

FIG. 2A is an enlarged view of its appearance, and FIG. 2B, its cross section.

FIG. 3A is an enlarged view of its appearance, and FIG. 3B, its cross section.

FIG. 4A is an enlarged view of its appearance, and FIG. 4B, its cross section.

DESCRIPTION OF THE PREFERRED EMBODIMENTS

Thermochromic Dry Offset Ink

Figure 1A:
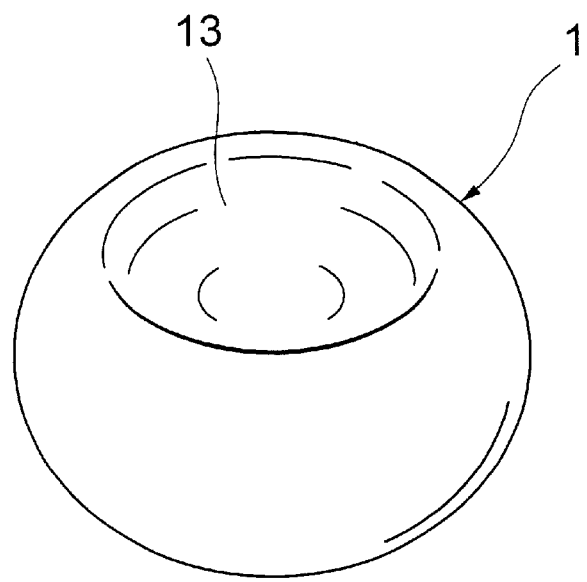
FIGS. 1A and 1B show an example of the thermochromic pigment material applied in the thermochromic dry offset ink of the present invention.

The present invention is a thermochromic dry offset ink comprised basically of a dry offset ink medium and a thermochromic pigment material dispersed therein. The thermochromic pigment material is a pigment material which has a microcapsular form having non-round particle cross section and has a thermochromic material enclosed in the microcapsules.

As the thermochromic pigment material, it is effective to use a material prepared by making into microcapsules a known reversible thermochromic material comprised of three essential components which are an electron-donating color-developing organic compound, an electron-accepting compound capable of making the electron-donating color-developing organic compound develop a color and a medium compound having a polar group capable of controlling the temperature at which the color-developing reaction of the both compounds takes place. Stated specifically, usable are those disclosed in U.S. Pat. Nos. 4,028,118 and 4,732,810 and so forth, which have been proposed by the present applicant. These materials change in color at about a given temperature (color-changing point) making a border, and in the normal temperature region can only exist in any one specific state of both states before and after their color change. More specifically, these have thermochromic properties of a type that shows what is called a small hysteresis width (ΔH) on temperature/color density due to changes in temperature to cause metachromatism, in which the other state is maintained so long as the heat or cold that is required for them to come into that state is applied, but returns to the state shown in the normal temperature region once the heat or cold comes not to be applied.

Also effective are those disclosed in U.S. Pat. Nos. 4,720,301, 5,879,443, and so forth, which have been proposed by the present applicant. These are materials prepared by making into microcapsules a thermochromic material of a type that shows great hysteresis characteristics to cause metachromatism, i.e., those capable of changing in color following courses which are greatly different in shape of curves formed by plotting changes in coloring density due to changes in temperature, between a case where the temperature is raised from the side of a temperature lower than a color-changing temperature region and a case where inversely the temperature is dropped from the side of a temperature higher than the color-changing temperature region, and memorizing a state changed at a low-temperature side color-changing point or at a high-temperature side color-changing point, in the normal temperature region between the low-temperature side color-changing point and the high-temperature side color-changing point.

The present invention requires that, in the pigment material which has a microcapsular form, the pigment material has non-round particle cross section, i.e., stated more specifically, non-round particle cross section having a hollow at some part of a particle outer surface (see FIGS. 1A and 1B to FIGS. 4A and 4B).

Such a thermochromic pigment material is a pigment material having a non-spherical form and a flat particle shape. Hence, it may readily align in small thickness on the substrate surface, and moreover can appropriately undergo elastic deformation to relieve stress when any pressure of transfer rolls is applied thereto in the step of printing, bringing about the effect of keeping capsule wall films from breaking. In the step of high-temperature heating, wall films undergo elastic deformation in accordance with thermal expansion and constriction of capsules to bring about the effect of keeping capsule wall films from breaking, and function effectively as a thermochromic pigment material having a microcapsular form which is tough enough to protect the reversible thermochromic material enclosed therein and make it retain the intended thermochromic function.

The thermochromic pigment material may have an average particle diameter [(length+breadth)/2] of from 0.5 $\mu$m (preferably 1.0 $\mu$m) to 5.0 $\mu$m. If it has an average particle diameter smaller than 0.5 $\mu$m, although a thermochromic pigment material made into microcapsules in a state suspended in an aqueous medium can be obtained, there is a difficulty in isolation of the encapsulated pigment material by a means such as filtration or centrifugation, and also an insufficient strength may result.

On the other hand, in a system having an average particle diameter larger than 5.0 $\mu$m, coarse particles having diameters larger than the above particle diameter may be held in a large proportion and, at about proportion more than 10% by volume of the whole thermochromic pigment material particles, the coarse particles tend to accumulate at the part where rolls come into contact, so that the ink may not smoothly be roll to roll transferred to become more accumulated than transferred, resulting in a gradual lowering of density in the course of continuous printing, undesirably.

Accordingly, in high-speed dry offset printing which involves the thermochromic pigment material, it is effective for the ink to be so constituted that at least 90% by volume of particles in the whole thermochromic pigment particles are held within the particle size distribution of from 0.5 $\mu$m to 5.0 $\mu$m, in order for the ink to be smoothly transferred to a printing article in a transfer performance surpassing the accumulation of the thermochromic pigment material between rolls.

In the thermochromic pigment material made into microcapsules according to the present invention, the proportion of the reversible thermochromic material to wall film in each capsule, i.e., reversible thermochromic material/wall film may preferably be in the range of 7/1 to 1/1 (weight ratio). If the reversible thermochromic material is in a proportion beyond the above range, the wall film may have so small a thickness as to have a low function to protect the reversible thermochromic material enclosed therein. If on the other hand the wall film is in a proportion beyond the above range, a low coloring density may inevitably result, undesirably.

The thermochromic pigment material may be produced in the manner as described below. As a means by which the reversible thermochromic material is enclosed in microcapsules, any known encapsulation process may be used, as exemplified by interfacial polymerization, interfacial polycondensation, in-situ encapsulation, or coacervation. In order to obtain the thermochromic pigment material of the present invention, having the particle size distribution that satisfies the requirements described above, interfacial polymerization or interfacial polycondensation is preferred, which may hardly cause agglomeration and coalescence. Also, after encapsulation has been completed, the resultant capsule suspension may optionally be diluted with water, and impurities and coarse particles may be filtered off by means of a filter to remove unwanted impurities and coarse particles.

The filter may include filters for industrial use such as stainless steel nets, synthetic resin mono-filament nets, synthetic resin multi-filament nets, ultrafine fiber filters, cotton cloth, nonwoven fabric, needle felt and filter paper, any of which may be used alone or in appropriate combination.

Incidentally, in order to keep the preferred particle diameter range of the thermochromic pigment material and to control formation of coarse particles to keep the proper particle size distribution, it is effective to use water-soluble macromolecules such as water-soluble acrylic resins, polyvinyl alcohol and ethylene-maleic anhydride copolymer resins, water soluble cellulose derivatives such as arabic gum, hydroxypropyl cellulose, sodium alginate and methyl cellulose, and water-soluble starches such as gelatin and albumin, as well as surface-active agents and emulsifiers.

The thermochromic pigment material dispersion from which coarse particles have been filtered off may further be subjected to centrifugation or filtration for the purpose of isolation of the thermochromic pigment material, to obtain a water-containing thermochromic pigment material having a water content of from 30% by weight to 50% by weight.

The water-containing thermochromic pigment material is further mixed with an offset ink vehicle and is uniformly dispersed in the vehicle, in the course of which the water content the thermochromic pigment material has is removed by flushing, vacuum evaporation or the like.

As a resin used for the offset ink vehicle in which the thermochromic pigment material is to be dispersed, it may be exemplified by the following.

It may include non-drying oil alkyd resins, semi-drying oil alkyd resins, drying oil alkyd resins, urethane-modified alkyd resins, styrene-modified alkyd resins, acryl-modified alkyd resins, epoxy-modified alkyd resins, phenol-modified alkyd resins, oil-free alkyd resins, acid-setting alkyd resins, rosin-modified alkyd resins, rosin-modified phenolic resins, rosin-modified maleic resins, acrylic resins, acrylpolyols, epoxy resins and epoxy-modified alkyd resins.

Any of the above resins may be used alone or in combination of two or more types, and are usually available as mediums dissolved with solvents and oils.

As the solvents, in view of press stability of ink in offset printing, usable are relatively slow-drying solvents such as industrial solvent, kerosine, Solvesso 100, Solvesso 150, xylene, mineral spirit, n-butanol, anone (cyclohexanone), isophorone, cellosolves and cellosolve acetates.

The above resin or medium may further optionally be cross-linked. Usually, in the case of a baking type, an amino resin such as butylated urea resin, butylated urea melamine resin, butylated melamine resin or butylated benzoguanamine resin may be mixed as a cross-linking agent, a metallic drying agent may be added, or an isocyanate type cross-linking agent may be added to effect cross-linking at a high temperature or a medium temperature.

Ultraviolet-ray-curable mediums and electron-ray-curable mediums are also applicable in the present invention. The following prepolymers, oligomers and monomers may optionally be used in combination, which are as exemplified below.

As acrylate radical polymerization types, they may be exemplified by photopolymerizable prepolymers such as epoxy acrylate, urethane acrylate, oligoester acrylate and polyester acrylate.

As those classified as photopolymerizable monomers or dilute monomers, they may include acrylate compounds having a relatively low viscosity, as exemplified by 2-ethylhexyl acrylate, butanediol acrylate, diethylene glycol diacrylate, tetraethylene glycol diacrylate, 1,6-hexanediol diacrylate, neopentyl glycol diacrylate, trimethylolpropane triacrylate, pentaerythritol triacrylate, pentaerythritol tetracrylate, dipentaerythritol hexacrylate, neopentyl glycol acrylate benzoate, 2-acryloyloxyethyl acid phosphate, 2-hydroxyethyl acrylate, isooctyl acrylate and benzyl acrylate.

Any of the above materials may optionally be used in combination, and a photoinitiator and a sensitizer may further be added, to use them as acrylate type mediums.

As a cationic polymerization type, usable are cationic polymerization type mediums prepared in combination of liquid epoxy resin with an initiator capable of forming protons or acid upon irradiation by light. Other usable photo-curable mediums may include ene-thiol addition reaction type mediums.

In the dry offset medium, a thixotropy-providing agent, an extender pigment, a diluting general-purpose solvent, an antioxidant, an ultraviolet light absorber, a polymerization inhibitor for stabilization in the dark, a non-polymerizable polymer, a leveling agent, an anti-foaming agent, an adhesion-providing agent and so forth may further optionally appropriately be mixed.

The thermochromic pigment material and the medium may be mixed in such a proportion that, in the state of an ink having been dehydrated, the thermochromic pigment material is in an amount ranging from 10 to 60 parts by weight (in terms of solid matter), and preferably from 20 to 50 parts by weight, based on 100 parts by weight of the medium containing all the cross-linking agent, solvent and additives. If the thermochromic pigment material is in an amount more than 50 parts by weight, ink properties required for offset ink, in particular, tack value and DM value (diameter value) may lower to cause a lowering of ink transfer performance. Also, if the thermochromic pigment material is in an amount less than 10 parts by weight, the ink, though having a good ink transfer performance, may have too low a pigment density to provide a good printing effect.

The present inventor has also discovered that fine particles having particle diameter larger than the average particle diameter of the thermochromic pigment material, being hard and being not broken even when kneaded between printing rolls may be mixed in the ink, and this enables stable printing without causing any break or deterioration of the thermochromic pigment material even in long-time continuous printing. Such fine particles may preferably be a material having a particle diameter a little larger than the average particle diameter of the thermochromic pigment material, and those having a more uniform particle size distribution within the range of a maximum diameter not larger than 10 $\mu$m may be used. The fine particles act as a constant spacer to relieve the pressure applied directly to the thermochromic pigment material between rolls, and hence can greatly improve press stability of the thermochromic pigment material.

As fine particles that satisfy such a function, usable is a material selected from fine thermosetting-resin powder, fine thermoplastic-resin powder and fine inorganic-material powder. The desired object can be achieved by its addition in an amount ranging from 5 to 20% by weight based on the weight of the solid matter of the thermochromic pigment material.

The fine thermosetting-resin powder may include fine powders of melamine resins, benzoguanamine resins, urea melamine resins, epoxy resins, cross-linked acrylic resins, cross-linked styrene resins, unsaturated polyester resins, silicone resins and urethane resins. The fine thermoplastic-resin powder may include fine powders of nylon resins, polyester resins, polypropylene resins, polyethylene resins, styrene resins, acrylate resins, methacrylate resins and vinyl chloride resins.

The fine inorganic-material powder may include fine powders of silica, alumina, calcium carbonate, barium carbonate, magnesium carbonate, inorganic hollow baked products, glass beads, boron nitride, zinc oxide and tungsten oxide.

As the above fine powder, those having an average particle size little larger than the average particle diameter of the thermochromic pigment material are used, but those having particle diameter smaller than the average particle diameter of the thermochromic pigment material may partly be contained without any difficulties. If necessary, the fine powder may previously be made finer by a means such as classification or filtration so that any coarse particles of 10 $\mu$m or larger are not included, thus the requirements of the present invention can be satisfied. Even in such spacer particles, inclusion of coarse particles into ink in a large quantity is concerned with ink transfer performance, and is not preferable. Accordingly, preferably usable are fine particles having an average particle diameter a little larger than the average particle diameter of the thermochromic pigment material and containing 5 $\mu$m or larger particles in an amount not more than 10% by volume.

Printed Article

The printed article having a thermochromic print layer formed using the thermochromic dry offset ink of the present invention will be described below.

The thermochromic dry offset ink having thermochromic properties, obtained in the present invention, is applicable also to sheetlike materials such as paper, synthetic paper and film, but can be effective especially when used in the printing on articles such as containers by dry offset printing of a high-speed printing curved-surface printing system. The containers on which patterns are to be printed by such a system may include containers made of plastic by injection molding, plastic-foam containers produced by compression molding, glass containers, and aluminum cans formed by drawing. Usually, such containers have the shape of a cylinder or conical trapezoid, and prints are applied on their sidewalls.

The dry offset ink having thermochromic properties may be used alone or in combination with any general-purpose ink, and printing is performed by means of a plurality of units. The dry offset ink may be loaded on a plurality of units so that images can be printed superimposingly to make print density higher.

Containers on which patterns have been printed in this manner are usually further provided with top coatings, which have the function to protect printed surfaces physically, impart appearance glossiness and impart light-fastness.

Incidentally, the thermochromic pigment material used in the present invention has opacifying properties inferior to those of common non-thermochromic pigment materials and has a rich transparency. Because of such features, in a system where the print layer is thinly formed as in the offset printing, the transparency may bring about a difficulty when printing substrates are transparent films, transparent plastics, glass or aluminum sheets or have aluminum metallized surfaces, making the thermochromic pigment material have a color-developing density which looks low in its color-developed state.

To eliminate such a problem, white-hiding printing may preferably be applied at the part where the ink of the present invention is applied for printing. Alternatively, an opacifying pigment such as titanium oxide may preferably be added in the ink in an amount of 5 to 60% by weight based on the weight of the thermochromic pigment material, to provide opacifying properties.

In order to make colorful the color tones of the thermochromic print layer, the thermochromic pigment material may be used in combination with non-thermochromic pigment materials as exemplified by common pigments, fluorescent pigments, light-storing pigments, luminous pigments and pearlescent pigments.

The thermochromic dry offset ink may be obtained by dispersedly mixing the micro-encapsulated thermochromic pigment material having non-round particle cross section, in the dry offset ink medium in the prescribed quantity. Using this ink, a pattern may be printed on the surface of an object article by general-purpose offset printing to obtain the offset printed article provided with the thermochromic print layer (inclusive of images).

EXAMPLES

The present invention will be described below in greater detail by giving Examples. In the following Examples, "part(s)" indicates "part(s) by weight".

Example 1

A thermochromic material comprised of 5 parts of 2-(4-diethylamino-2-ethoxyphenyl)-3-(1-ethyl-2-methyl indol-3-yl)-4-azaphthalide, 10 parts of 1,1-octylidene bisphenol and 50 parts of butyl stearate was uniformly dissolved, and 30 parts of an aromatic isocyanate prepolymer as a wall-film material and 30 parts of ethyl acetate were added thereto, followed by uniform dissolution at 70° C. to obtain a solution, which was then emulsified at 70° C. in an aqueous 15% gelatin solution. Here, the thermochromic material/wall-film material=2.2/1.0 (weight ratio).

To carried out the emulsification, the stirring force of a homomixer was so regulated that the particle size of at least 90% by volume (cumulative) of particles in the whole particles was distributed in 2.0 to 3.0 $\mu$m. After the emulsification was completed, the stirring was continued for about 1 hour, and thereafter 2.5 parts of a water-soluble fatty acid modified amine was added. Then the stirring was further continued for 5 hours to obtain a microcapsular suspension containing a thermochromic pigment material having an average particle diameter of 2.5 $\mu$m.

Figure 1B:
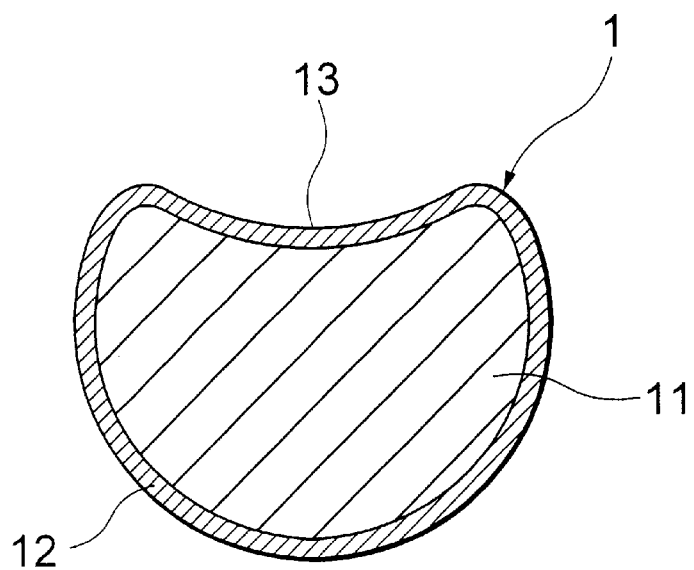

After the reaction was completed, the microcapsular suspension thus obtained was diluted with a 5-fold amount of water, and thereafter filtered with a 400-mesh stainless steel net filter, followed by centrifugation to isolate the thermochromic pigment material to obtain a thermochromic pigment material having a water content of 35% by weight (having the particle shape as shown in FIGS. 1A and 1B).

The thermochromic pigment material thus obtained was set in a centrifugal sedimentation automatic particle size distribution measuring instrument (trade name: CAA-300; manufactured by Horiba Seisakusho) to measure its particle size distribution. As the result, representing particle diameter as D, the following particle size distribution was given as the relationship between particle diameter and volume percentage (shown in parentheses):

D<0.5 $\mu$m (0%), 0.5≦D<2.0 (20%), 2.0≦D<3.0 (25%), 3.0≦D<4.0 (38%), 4.0≦D<5.0 (18%) and D>5.0 (9%); average particle diameter: 3.6 $\mu$m. It was also ascertained that 91% of particles of the thermochromic pigment material were within the range of from 0.5 $\mu$m to 5.0 $\mu$m in diameter.

Subsequently, 40 parts of the water-containing thermochromic pigment material and 60 parts of an ultraviolet-ray-curable dry offset medium were kneaded for 8 hours under reduced pressure to obtain a thermochromic UV-curable dry offset ink.

This ink was applied in a curved-surface printing type dry offset printer, and patterns were printed on the whole peripheries of polystyrene containers at 450 containers/minute. Thereafter, these were irradiated by light for about 1 second at an irradiation distance of 8 cm by mean of a 80 W/cm high-pressure mercury lamp to cure the ink.

From the start of printing, a good ink transfer performance on the containers was maintained, and no change in density of prints was seen even after 1 hour, compared with that of prints at the initial stage. The printed containers stood blue at about 16° C. or below, and colorless at 22° C. or above.

Example 2

A thermochromic material comprised of 3 parts of 6-(ethylisobutylamino)benzofluorane, 8 parts of 2,2-isobutylidene bisphenol, 25 parts of stearyl alcohol and 25 parts of stearyl laurate was heated and dissolved, and 30 parts of an epoxy resin as a wall-film material and 40 parts of ethyl acetate were added thereto, followed by uniform dissolution at 70° C. to obtain a solution, which was then emulsified in an aqueous protective colloidal medium. Here, the thermochromic material/wall-film material=6.1/1.0 (weight ratio).

Figure 2A:
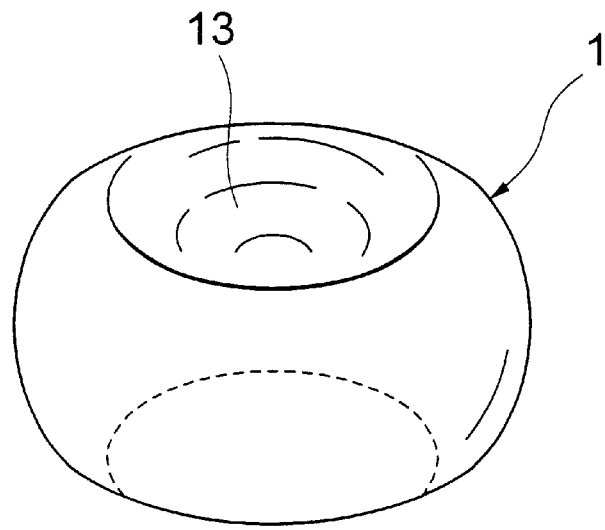
FIGS. 2A and 2B show another example of the thermochromic pigment material applied in the thermochromic dry offset ink of the present invention.
Figure 2B:
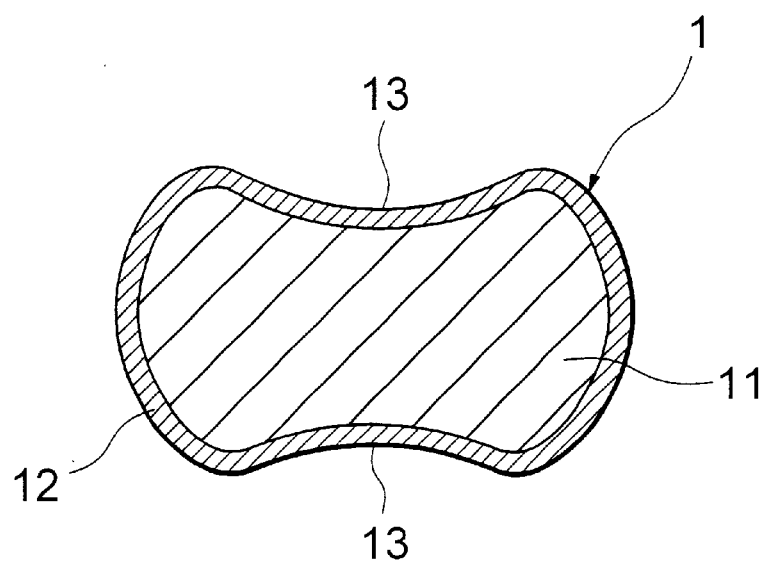
Figure 3A:
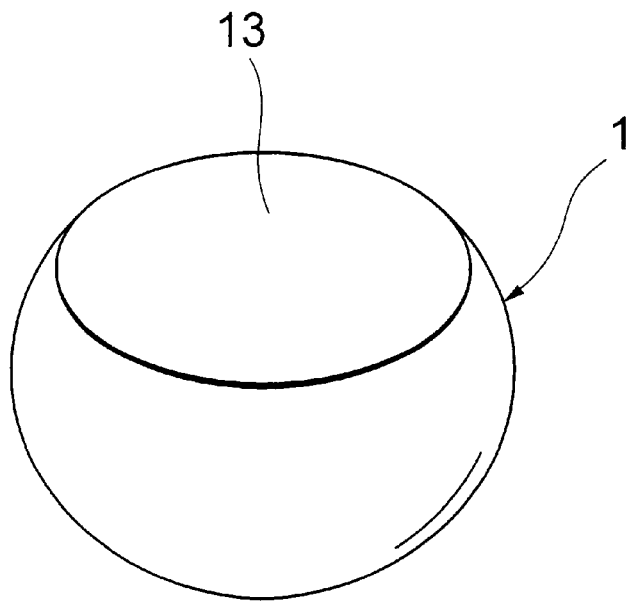
FIGS. 3A and 3B show still another example of the thermochromic pigment material applied in the thermochromic dry offset ink of the present invention.
Figure 3B:
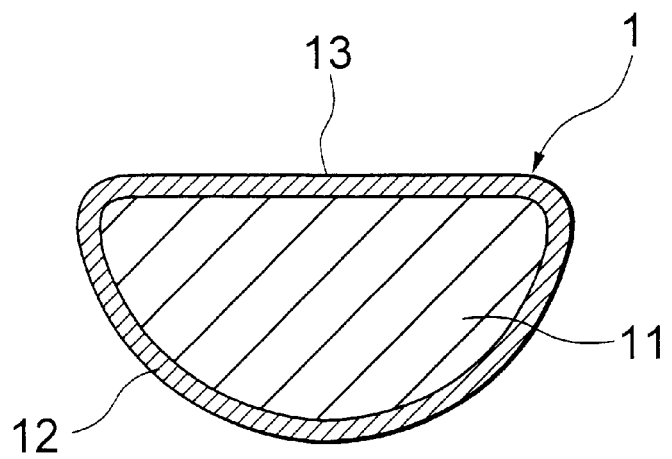
Figure 4A:
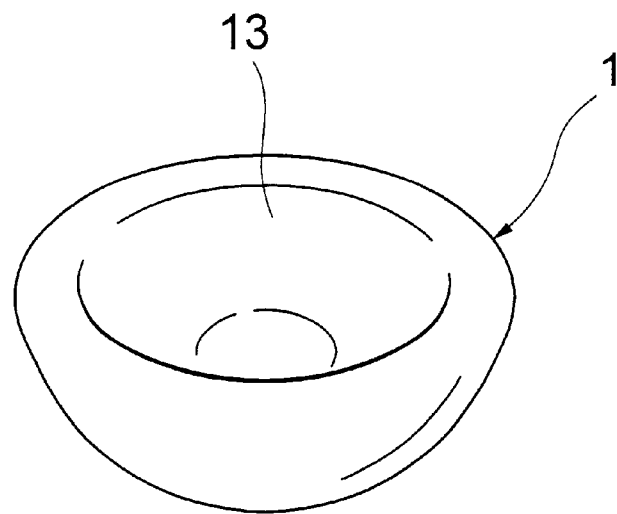
FIGS. 4A and 4B show a further example of the thermochromic pigment material applied in the thermochromic dry offset ink of the present invention.
Figure 4B:
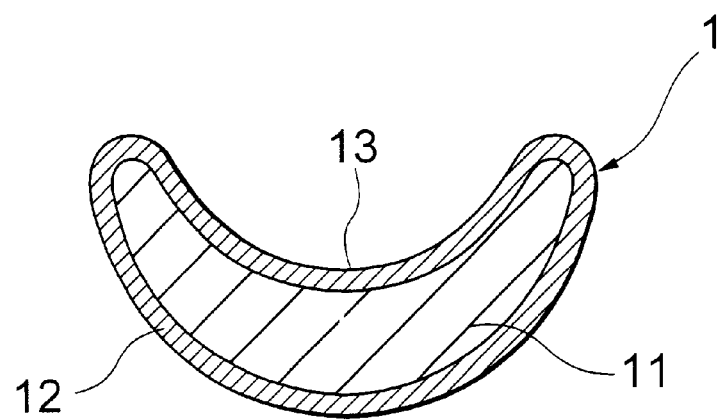

To carried out the emulsification, the stirring force of a homomixer was so regulated that the particle size of at least 90% by volume of particles in the whole particles was distributed in 2.0 to 3.0 $\mu$m. After the emulsification was completed, 5 parts of a water-soluble fatty acid modified amine was added, and the stirring was further continued for 5 hours to obtain a microcapsular suspension containing a thermochromic pigment material which finally had the particle shape as shown in FIGS. 2A and 2B and had an average length diameter of about 2.5 μm.

After the reaction was completed, the microcapsular suspension thus obtained was diluted with a 5-fold amount of water, and thereafter filtered with a 400-mesh stainless steel net filter, followed by centrifugation to isolate the thermochromic pigment material to obtain a thermochromic pigment material having a water content of 35% by weight.

Subsequently, 30 parts of the water-containing thermochromic pigment material and 70 parts of an oxidative polymerization type water-free lithographic offset medium were uniformly dispersed and kneaded, followed by removal of water under reduced pressure to obtain a thermochromic dry offset ink.

This ink was applied in a sheet-by-sheet type offset printer, and designs of a starlike ground tint were printed on woodfree paper. The thermochromic pigment material itself had thermochromic temperature that it turned pink at about 40° C. or below and turned colorless at 43° C. or above.

From the start of printing, a good ink transfer performance was maintained, and no change in density of prints was seen even after 1 hour, compared with that of prints at the initial stage.

Example 3

To a thermochromic material comprised of 4 parts of 2-dibenzylamino-6-diethylaminofluorane, 10 parts of 1,1-hexylidene bisphenol, 30 parts of n-butyl stearate and 20 parts of n-butyl palmitate, 20 parts of an aromatic isocyanate prepolymer as a wall-film material and 20 parts of ethyl acetate as a solvent were added thereto, followed by uniform dissolution at 70° C. to obtain an inclusion solution, which was then emulsified in an aqueous 15% arabic gum solution. Here, the thermochromic material/wall-film material=3.2/1.0 (weight ratio).

To carried out the emulsification, the stirring force of a homomixer was so regulated that the particle size of at least 90% by volume of particles in the whole particles was distributed in 1.0 to 3.0 μm. After the emulsification was completed, the stirring was continued for about 1 hour, and thereafter 2.5 parts of a water-soluble fatty acid modified amine was added, and the stirring was further continued for 5 hours to obtain a microcapsular suspension.

After the reaction was completed, the microcapsular suspension thus obtained was diluted with a 5-fold amount of water, and thereafter filtered with a 400-mesh stainless steel net filter, followed by further filtration with cotton cloth. Then, centrifugation was carried out to isolate the thermochromic pigment material to obtain a thermochromic pigment material having a water content of 33% by weight (having the particle shape as shown in FIGS. 1A and 1B).

Particle size distribution of the thermochromic pigment material thus obtained was measured in the same manner as in Example 1. As the result, the following particle size distribution was given:

D<0.5 μm (7%), 0.5≦D<2.0 (62%), 2.0≦D<3.0 (17%), 3.0≦D<4.0 (8%), 4.0≦D<5.0 (2%) and D>5.0 (1%); average particle diameter: 1.4 μm. It was also ascertained that 96% of particles of the thermochromic pigment material were in the range of from 0.5 μm to 5.0 μm in diameter.

Subsequently, 30 parts of the water-containing thermochromic pigment material and 70 parts of an alkyd resin type aluminum-can dry offset medium were uniformly dispersed and kneaded, followed by removal of water under reduced pressure to obtain a thermochromic dry offset ink.

This ink was applied in a curved-surface printing type dry offset printer, and patterns were printed on the whole peripheries of aluminum cans at 60 cans/minute, followed by baking at 190° C. for 4 minutes.

From the start of printing, a good ink transfer performance on the cans was maintained, and no change in density of prints was seen at all even after 2 hours, compared with that of prints at the initial stage.

Further 1 hour thereafter, rolls of the printer were washed with a solvent, where no thermochromic pigment material was seen to have accumulated at gaps between the rolls at all.

The aluminum cans thus obtained were filled with drinking water (potable water), and then cooled in a refrigerator (refrigerator internal temperature: 5° C.), whereupon they turned green. They kept green even when taken out to an atmosphere of room temperature (25° C.) and left for a while. Then the drinking water contained was reduced to a half, whereupon, correspondingly thereto, the portion filled with drinking water stood green, but the other portion turned to the ground aluminum color as a result of color extinguishment of the thermochromic pigment material.

The thermochromic pigment material itself had thermochromic temperature that it stood black at 8° C. or below and turned colorless at 12° C. or above. Any deterioration due to the heat of the baking was not observable.

As described above, in the thermochromic dry offset ink of the present invention, the thermochromic pigment material (the pigment material having a form where the thermochromic material is enclosed in microcapsules) dispersed in the medium has a hollow at some part of a particle outer surface. Hence, it can appropriately undergo elastic deformation due to any pressure applied thereto in the step of high-speed offset printing, to keep capsule wall films from breaking. In the course of high-temperature heating, it can freely undergo appropriate elastic deformation of expansion and constriction to keep the capsule wall films from breaking. Moreover, with respect to substrate surface, it can also align properly to printing surface in accordance with the flat particle shape of the pigment material, to satisfy offset printability. Also, the use of the pigment material having a specific particle size distribution ensures long-time high-speed printability without damaging roll-to-roll ink transfer performance, and is effective for sheet-by-sheet printing on paper, film and so forth and especially for curved-surface printing on metallic cans and so forth.

In the printed article of the present invention, such as the container having a thermochromic print layer formed using the above printing ink, it has a uniform thermochromic layer and can continually exhibit stable thermochromic properties, having the effect of displaying any proper or unsafe temperature of contents such as drinks, foods, drugs and cosmetics put in containers, as well as a decorative effect.

What is claimed is:

1. A thermochromic dry offset ink, comprising a dry offset ink medium and a thermochromic pigment material dispersed therein, wherein the thermochromic pigment material is a pigment material which has a microcapsular form having non-round particle cross section and has a thermochromic material enclosed in the microcapsules, and wherein said thermochromic pigment material has a hollow at some part of its outer surface.

2. A thermochromic dry offset ink, comprising a dry offset ink medium and a thermochromic pigment material dispersed therein, wherein the thermochromic pigment material is a pigment material which has a microcapsular form having non-round particle cross section and has a thermochromic material enclosed in the microcapsules, and which contains at least one fine powder having the function of a spacer, said-fine powder being selected from the group consisting of a fine thermosetting-resin powder, a fine thermoplastic-resin powder and a fine inorganic-material powder, the fine powder having a particle diameter larger than the average particle diameter of said thermochromic pigment material and being contained in an amount ranging from 5% by weight to 20% by weight.

3. The thermochromic dry offset ink according to claims 1 or 2, wherein said thermochromic pigment material has an average particle diameter in the range of from 1.0 $\mu$m to 5.0 $\mu$m.

4. The thermochromic dry offset ink according to claims 1 or 2, wherein said thermochromic pigment material is a pigment material which has a microcapsular form of thermochromic material/wall film=7/1 to 1/1 (weight ratio).

5. The thermochromic dry offset ink according to claims 1 or 2, wherein said thermochromic pigment material is held by from 10 parts by weight to 60 parts by weight per solid matter of the medium, based on 100 parts by weight of the medium.

6. A printed article provided with a thermochromic print layer formed by offset printing, utilizing a thermochromic dry offset ink comprising a dry offset ink medium and a thermochromic pigment material dispersed therein, wherein the thermochromic pigment material is a pigment material which has a microcapsular form having non-round particle cross section and has a thermochromic material enclosed in the microcapsules, and wherein said thermochromic pigment material has a hollow at some part of its outer surface.

7. A printed article provided with a thermochromic print layer formed by offset printing, utilizing a thermochromic dry offset ink comprising a dry offset ink medium and a thermochromic pigment material dispersed therein, wherein the thermochromic pigment material is a pigment material which has a microcapsular form having non-round particle cross section and has a thermochromic material enclosed in the microcapsules, and which contains at least one fine powder having the function of a spacer, said-fine powder being selected from the group consisting of a fine thermosetting-resin powder, a fine thermoplastic-resin powder and a fine inorganic-material powder, the fine powder having a particle diameter larger than the average particle diameter of said thermochromic pigment material and being contained in an amount ranging from 5% by weight to 20% by weight.

8. The printed article according to claim 6 or 7, which is a container on the surface of which said thermochromic print layer is provided.

9. A printed article according to claim 7, said thermochromic pigment material having an average particle diameter in the range of from 1.0 $\mu$m to 5.0 $\mu$m.

10. A printed article according to claim 6, said thermochromic pigment material having an average particle diameter in the range of from 1.0 $\mu$m to 5.0 $\mu$m.

11. A printed article according to claim 10, said thermochromic pigment having a microcapsular form of thermochromic material/wall film=7/1 to 1/1 (weight ratio).

12. A printed article according to claim 9, said thermochromic pigment having a microcapsular form of thermochromic material/wall film=7/1 to 1/1 (weight ratio).

13. A printed article according to claim 6, wherein the thermochromic pigment material is held by from 10 parts by weight to 60 parts by weight per solid matter of the medium, based on 100 parts by weight of the medium.

14. The printed article according to claim 10 or 9, which is a container on the surface of which said thermochromic print layer is provided.

15. A printed article according to claim 7, wherein the thermochromic pigment material is held by from 10 parts by weight to 60 parts by weight per solid matter of the medium, based on 100 parts by weight of the medium.

16. The printed article according to claim 11 or 12, which is a container on the surface of which said thermochromic print layer is provided.

17. The printed article according to claim 13 or 15, which is a container on the surface of which said thermochromic print layer is provided.

\* \* \* \* \*